Aug. 15, 1950
E. V. COCHRAN
2,518,756
ELECTRIC MOTOR
Filed May 20, 1949
2 Sheets-Sheet 1
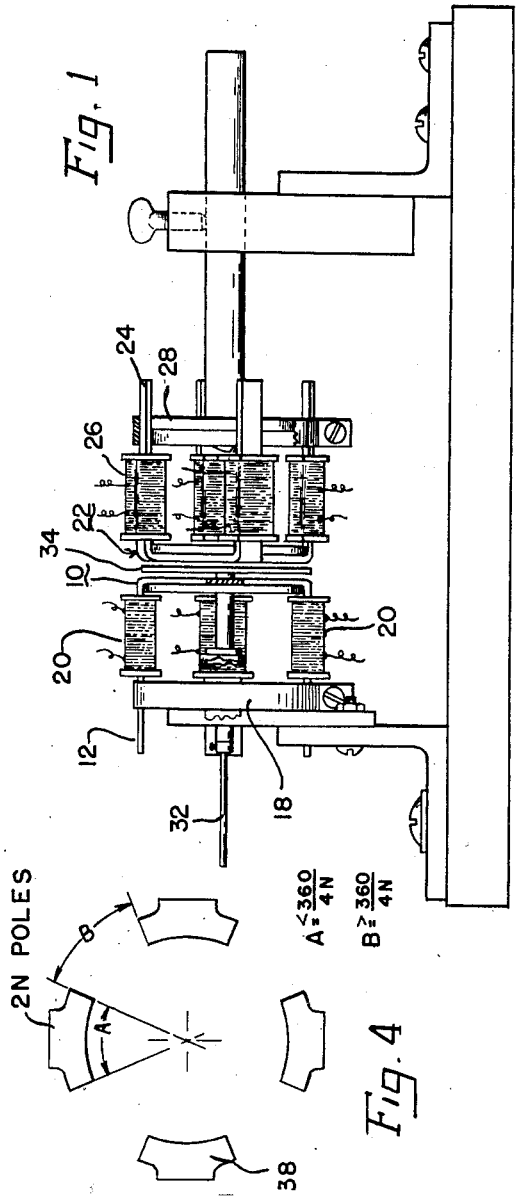
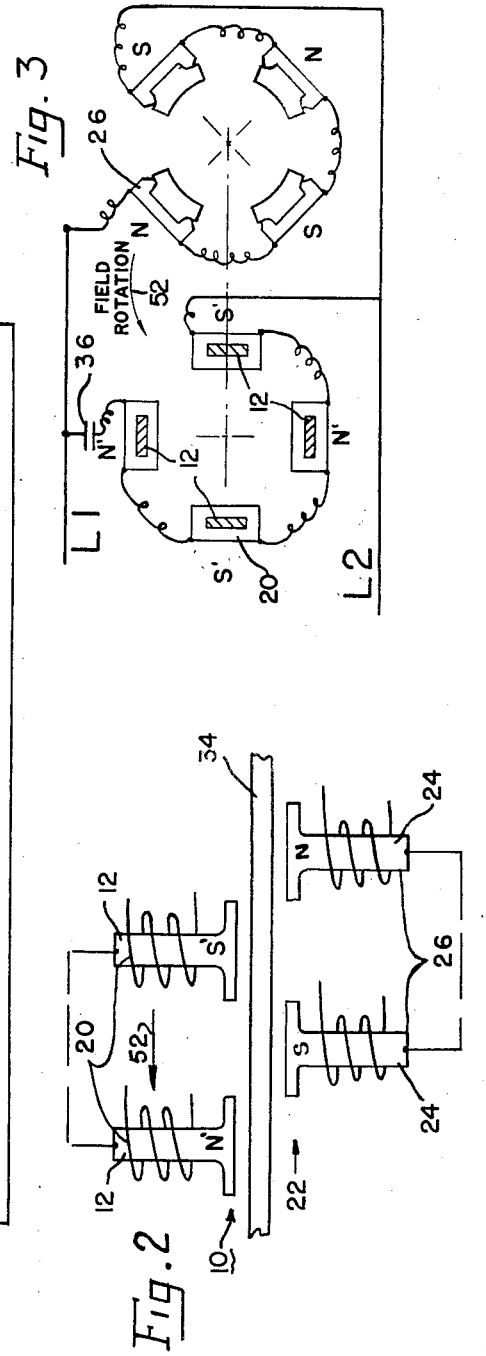
INVENTOR
EARL V. COCHRAN
By Toulmin & Toulmin
ATTORNEYS Aug. 15, 1950      E. V. COCHRAN      2,518,756
ELECTRIC MOTOR
Filed May 20, 1949      2 Sheets-Sheet 2
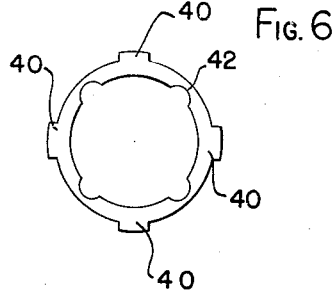
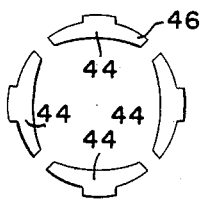
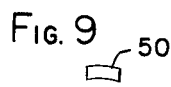
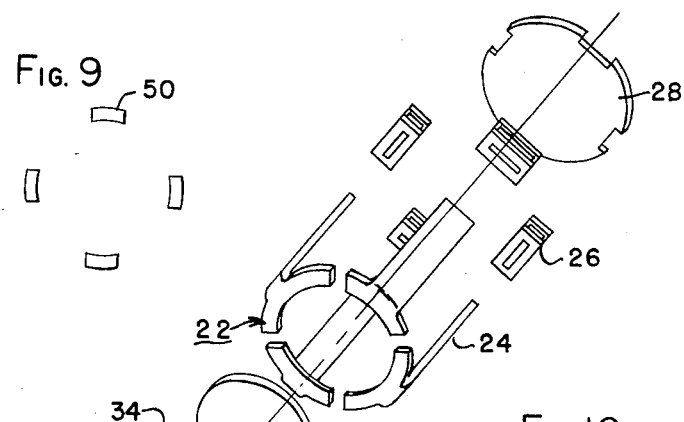
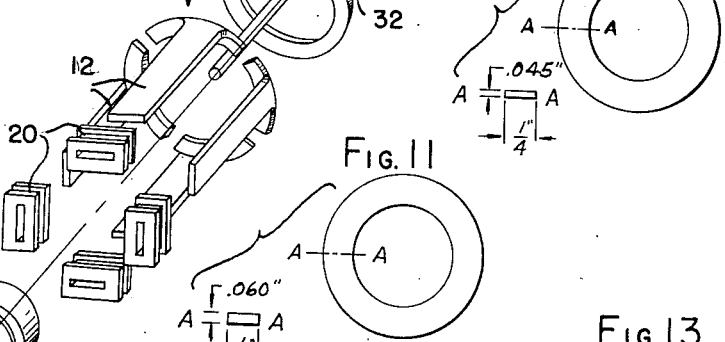
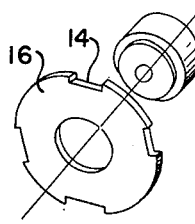
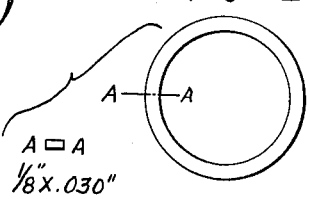
INVENTOR
EARL V. COCHRAN
BY Toulmin & Toulmin
ATTORNEYS.

Patented Aug. 15, 1950

2,518,756

UNITED STATES PATENT OFFICE 2,518,756

ELECTRIC MOTOR

Earl Vernon Cochran, Dayton, Ohio, assignor to Hansen Manufacturing Company, Princeton, Ind., a corporation of Indiana Application May 20, 1949, Serial No. 94,461

3 Claims. (Cl. 172—120)

This invention relates to electric motors, and particularly to hysteresis type motors.

In electric motors there is always a certain loss which can be accounted for by the fact that the iron parts of the motor are subjected to varying degrees of magnetism as the motor operates and thus have induced therein parasitic hysteresis losses that contribute in no way to the operating efficiency of the motor.

In the conventional type of motor, such as the induction motor, hysteresis losses are kept low in both stator and rotor by proper slit design and use of soft iron. In the hysteresis motor, the rotor must necessarily be of highly hysteretic material instead of soft iron. Therefore, the fluctuation of flux density in the rotor as it passes between slots or poles causes the rotor to be put through minor hysteresis loops which result in power losses in the form of heat.

In hysteresis type motors there is a magnetically retentive rotor which is subjected to the action of a rotating electric field, and the tendency for the rotor to retain magnetism imparted thereto by the field causes it to lock into step with the field and to rotate at synchronous speed.

It has been attempted to reduce the hysteresis losses in a motor of this type by bridging between the poles with a magnetic bridge so that as the rotor turns relative to the stator it does not encounter such severe changes in field strength.

While this method for reducing hysteresis losses in the rotor has met with some success, it still leaves a good deal to be desired, and, accordingly, this invention has as its primary object a highly improved hysteresis motor arrangement in which the hysteresis losses in the rotor are substantially reduced.

Another object of this invention is to provide an electric motor arrangement wherein the advantages of magnetically bridging adjacent poles is realized but without the use of mechanical bridging means extending between the poles.

A still further object is the provision of an electric motor of the hystersis type in which substantially all of the flux from the field of the motor threads through the rotor and is thus useful working flux, but in which hysteresis losses in the rotor are reduced to a minimum.

These and other objects and advantages will become more apparent upon reference to the following description taken in connection with the accompanying drawings, in which:

Figure 1 is a side elevational view of a motor constructed according to this invention;

Figure 2 is a diagrammatic view showing the arrangement of the field poles relative to each other and to the rotor;

Figure 3 is a diagrammatic view showing the electric connections to the energizing coils of the motor of Figure 1;

Figure 4 is a view showing one of the preferred forms of pole configurations for the field poles;

Figure 5 is an exploded perspective view of the motor of Figure 1;

Figures 6, 7, 8 and 9 are views similar to Figure 4 but showing different pole arrangements; and Figures 10, 11, 12 and 13 are views showing rotor arrangements which have been found satisfactory.

Referring to the drawings, it will be seen in Figures 1 and 5 that the motor is of the axial air gap type. The field structure comprises a first set of field poles indicated at 10, and which are circumferentially spaced around the center axis of the motor and arranged so as to be coplanar. Each field pole has a part 12 extending rearwardly therefrom, and at the rear ends the parts 12 engage notches 14 in a magnetic plate 16 and are clamped tightly in position by clamping band 18.

There are preferably individual coils 20 on the parts 12 for energizing the field poles and these coils, as will be seen, are preferably serially connected so that alternate of the poles 10 are of opposite polarity at any instant of energization.

Axially spaced from field poles 10 is another set of circumferentially spaced field poles 22 corresponding in construction to field poles 10 in that they have parts 24 extending therefrom on which are mounted coils 26 and which parts are connected by the magnetic plate 28. The two sets of field poles represented by the poles 10 and poles 22 are circumferentially shifted relative to each other about the axis of the motor, preferably an amount equal to one-half the distance between any two adjacent poles of one set. It will be evident that this provides for staggering of the poles around the air gap therebetween.

Rotatably mounted on the axis of the motor is a rotary part 30 having shaft 32 and adapted for supporting the magnetic rim part 34 which is made of magnetically retentive material.

In Figure 2, which is a development showing the rotor rim and the field poles, it will be seen that the field poles taken in combination provide a substantially continuous field ring with one-half disposed on one side of the rotor, and the other half disposed on the other side. In this manner, a result is obtained which corresponds to that described above in respect to bridging between the poles, but which is more efficient than the bridging arrangement because all of the field flux is useful working flux.

The energizing windings represented by the coils 20 and 26 are connected as shown in Figure 3, wherein it will be seen that coils 20 are serially connected between power lines L1 and L2 and in series with a phase shifting reactance such as the condenser 36. The winding represented by coils 26 is also connected between power lines L1 and L2 with the individual coils thereof in series with each other but with no phase shifting reactance.

Figures 2 and 3 bring out the physical relationship of the poles and show how they are shifted relative to each other so that the poles of one set are substantially midway between the poles of the other set. The arrangement shown in Figure 3 will result in an effective field rotation in the direction of the arrow on Figure 3. As is well known in the art, this rotating field will drive the rotor between the field poles.

While a number of different pole arrangements are possible according to this invention, the preferred manner of arriving at the sizes of the poles is illustrated in Figure 4. In this figure, the poles 38 will be seen to be four in number, and with each thereof extending about 45 degrees around the periphery of the field structure. The space between adjacent of the poles is also about 45 degrees. This may be more generally stated as follows: There are 2N poles in each set. Each pole has a peripheral extent indicated as angle A in Figure 4 and wherein angle A is equal to or less than $$\frac{360}{4N}$$

The angular distance between adjacent of the poles is indicated at B, and wherein B is equal to or greater than $$\frac{360}{4N}$$

It will be understood that the number of poles in each set is the same, and that preferably the sets are angularly displaced one-half of the angular distance between the center lines of adjacent poles.

In Figure 6 a somewhat different pole arrangement is shown, wherein reference numerals 40 indicate the individual poles. In the arrangement shown in Figure 6, however, the poles are not discrete and separate, but are joined by a thin magnetic bridge, as indicated at 42.

In Figure 7, the poles 44 are separate, having no magnetic bridge therebetween, but are of greater circumferential extent than those indicated in Figure 4. The ends of the poles 44 preferably taper off somewhat, as indicated at 46.

Figures 8 and 9 illustrate still other pole arrangements with the poles 48 in Figure 8 having a circumferential extent considerably greater than that shown in Figure 4, and the poles 50 in Figure 9 being considerably smaller.

It will be understood that the pole arrangements shown in Figures 6 through 9 all effect satisfactory operation of the motor, but that the Figure 4 arrangement is to be preferred.

It has been mentioned that the rotor includes a magnetic rim part of magnetically retentive material, and a number of the possible forms that this member can take are shown in Figures 10 through 13. Preferably, the rotor rim is maintained relatively thin, as in Figure 10, in order to obtain the full benefits from the arrangement of this invention. This is preferable because while the magnetic field of the stator which links the rotor rim remains substantially constant at all times, it does shift from one side to the other of the rotor, and by keeping the rotor rim thin, the hysteresis losses that might be occasioned thereby are kept at a minimum.

One of the advantages of the axial air gap type motor is that it is much easier to form the two sets of field poles and the opposite faces of the rotor so that they are exactly parallel. This has a tendency further to reduce the variations in field strength encountered by the rotor and assists in maintaining the hysteresis losses in the motor at a minimum. Furthermore, due to the fact that the rotor runs at relatively low speed, the tolerable lack of concentricity thereof about its axis of rotation is considerably greater than the corresponding tolerance that can be given a radial air gap type rotor.

Referring to Figure 2, the operation of the motor can readily be seen. The field poles 20 are energized substantially 90 degrees ahead of poles 26, and, since the poles themselves are staggered, the field has a tendency to move in the direction of the arrow 52. This movement of the field pulls the rotor with it, and, a short period of time after the motor is energized, the rotor will be in step with the field and will thereafter operate synchronously.

It is to be noted that while distributed windings for the fields are shown and are to be preferred, each of the two field structures could be energized by a single coil or an arrangement could be arrived at whereby one coil energizes both field structures. Also, while a condenser has been shown as the phase shifting reactance, and is to be preferred because substantially a 90 degree phase shift can be attained, shading or lagging coils, an inductive reactance, a two phase supply system or other means could be utilized to obtain the desired phase angle between the magnetomotive forces of the two field structures.

It will be understood that this invention is susceptible to modification in order to adapt it to different usages and conditions, and, accordingly, it is desired to comprehend such modifications within this invention as may fall within the scope of the appended claims.

I claim:

1. In synchronous electric motor; a first group of circumferentially spaced co-planar field poles; a second group of circumferentially spaced co-planar field poles axially spaced from said first group, a rotor having a magnetically retentive rim part of uniform cross section running in said gap, said groups of poles being circumferentially offset from each other so as to be uniformly staggered about said gap, means adjustably supporting said poles for permitting axial adjustment thereof to vary the gap therebetween, an individual coil means for each pole energizable by alternating current for producing alternating magnetomotive forces between alternate poles of each of said groups, and means for shifting the phase of the magnetomotive forces of one group thereby to produce a rotating magnetic field in said gap, the amount of said shifting being substantially equal to the angular offset of the poles of one group from those of the other group, each said pole having a peripheral extent substantially equal to the spacing between the poles of each group.

2. In an axial air gap type hysteresis motor adapted for synchronous operation; a disk rotor having at least its rim part formed of magnetically retentive material and of uniform cross section, a first group of uniformly circumferentially spaced field poles on one side of said rotor and in a plane parallel thereto, a second group of field poles on the other side of said rotor in a plane parallel thereto and also uniformly circumferentially spaced, the poles of one group being circumferentially shifted relative to the poles of the other group by substantially one-half the distance between adjacent poles, individual energizing coils for said poles adapted for producing respectively opposite polarities in adjacent poles of each group, and a phase shifting reactance in circuit with the coils for the poles of one group, the circumferential extent of each pole being substantially equal to its spacing from adjacent poles in the same group.

3. In an axial air gap type hysteresis motor; a disk rotor having at least its rim part constructed of magnetically retentive material, a first group of circumferentially spaced poles on one side of said rotor in a plane parallel thereto, a second group of circumferentially spaced poles on the other side of said rotor in a plane parallel thereto and circumferentially shifted one-half pole space relatively to the poles of the first said group, individual energizing coils for the poles of each group and arranged so that alternate poles of each group are of alternate polarity at any instant of energization, and means for supplying energizing current to said coils so the phase difference between the energization of one group of poles is substantially equal to the amount of circumferential shifting of the one group of poles relative to the other, the peripheral extent of each pole being substantially equal to the peripheral extent of the space between adjacent poles in each group.

EARL VERNON COCHRAN.

REFERENCES CITED

The following references are of record in the file of this patent:

UNITED STATES PATENTS

| Number | Name | Date |
| --- | --- | --- |
| 1,419,749 | Murphy | June 13, 1922 |
| 1,737,128 | Ross | Nov. 26, 1929 |
| 2,234,420 | Traeger | Mar. 11, 1941 |

FOREIGN PATENTS

| Number | Country | Date |
| --- | --- | --- |
| 103,184 | Australia | Feb. 2, 1938 |
| 493,928 | Great Britain | Jan. 11, 1937 |